United States Patent
Davis et al.

(10) Patent No.: US 11,055,306 B2
(45) Date of Patent: Jul. 6, 2021

(54) TABLE-PER-PARTITION

(71) Applicant: ServiceNow, Inc., Santa Clara, CA (US)

(72) Inventors: Joseph Michael Davis, Carlsbad, CA (US); Joey Mart, San Marcos, CA (US)

(73) Assignee: ServiceNow, Inc., Santa Clara, CA (US)

( * ) Notice: Subject to any disclaimer, the term of this patent is extended or adjusted under 35 U.S.C. 154(b) by 233 days.

(21) Appl. No.: 16/286,313

(22) Filed: Feb. 26, 2019

(65) Prior Publication Data
US 2019/0278780 A1 Sep. 12, 2019

Related U.S. Application Data

(63) Continuation of application No. 15/586,119, filed on May 3, 2017.

(51) Int. Cl.
*G06F 16/27* (2019.01)
*G06F 16/25* (2019.01)
*G06F 16/22* (2019.01)

(52) U.S. Cl.
CPC .......... *G06F 16/252* (2019.01); *G06F 16/221* (2019.01); *G06F 16/2272* (2019.01); *G06F 16/2282* (2019.01); *G06F 16/278* (2019.01)

(58) Field of Classification Search
CPC .............................. G06F 16/221; G06F 16/278
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,389,448 B1 | 5/2002 | Primak et al. |
| 6,816,898 B1 | 11/2004 | Scapelli |
| 6,895,586 B1 | 5/2005 | Brasher |
| 7,027,411 B1 | 4/2006 | Pulsipher |
| 7,062,683 B2 | 6/2006 | Warpenburg |

(Continued)

FOREIGN PATENT DOCUMENTS

| | | |
|---|---|---|
| CA | 2618938 A1 | 7/2009 |
| CA | 285880 A1 | 6/2013 |
| CA | 2987822 A1 | 12/2016 |

OTHER PUBLICATIONS

Examination Report for Australian Application No. 2019226179 dated Apr. 29, 2020; 3 pgs.

(Continued)

*Primary Examiner* — Grace Park
(74) *Attorney, Agent, or Firm* — Fletcher Yoder PC

(57) ABSTRACT

The present approach improves the query performance of a database in a manner that is transparent to a user. In one aspect, this approach creates separate partition tables that are not directly accessible to a user of the database. A client-facing aspect of the database is a logical model which may correspond to a single, main table with which the user interacts. Thus, queries or operations may be generated on the client side in the context of the logical model. A database or query layer can then, transparent to the user, translate the user generated requests into query language that addresses the proper partitions to generate a result set or otherwise perform a database operation.

20 Claims, 5 Drawing Sheets

| | 356 | 358 | 360 |
|---|---|---|---|
| Sys_id | DISCRIMINATOR | Hardware_status | Used_for |
| 5849b6 | HARDWARE | INSTALLED | |
| 14862c | APPLICATION | | PRODUCTION |

350

| | | | |
|---|---|---|---|
| Sys_id | DISCRIMINATOR | a_str_1 | |
| 5849b6 | HARDWARE | INSTALLED | |
| 14862c | APPLICATION | PRODUCTION | |

354

356 362

(56) References Cited

U.S. PATENT DOCUMENTS

| | | | |
|---|---|---|---|
| 7,076,508 | B2 | 7/2006 | Bourbonnais et al. |
| 7,392,300 | B2 | 6/2008 | Anantharangachar |
| 7,610,512 | B2 | 10/2009 | Gerber |
| 7,617,073 | B2 | 11/2009 | Trinon |
| 7,877,783 | B1 | 1/2011 | Cline |
| 7,890,802 | B2 | 2/2011 | Gerber |
| 7,925,981 | B2 | 4/2011 | Pourheidari |
| 7,945,860 | B2 | 5/2011 | Vambenepe |
| 7,966,398 | B2 | 6/2011 | Wiles |
| 8,224,683 | B2 | 7/2012 | Manos |
| 8,554,750 | B2 | 10/2013 | Rangaranjan |
| 8,566,319 | B2 | 10/2013 | Sacco |
| 8,646,093 | B2 | 2/2014 | Myers |
| 8,674,992 | B2 | 3/2014 | Poston |
| 8,930,312 | B1 | 1/2015 | Rath et al. |
| 2006/0253473 | A1* | 11/2006 | Agrawal ............... G06F 16/278 |
| 2007/0016558 | A1 | 1/2007 | Bestgen et al. |
| 2007/0143344 | A1 | 6/2007 | Leniewski et al. |
| 2007/0288495 | A1* | 12/2007 | Narasayya ........... G06F 16/217 |
| 2007/0299810 | A1* | 12/2007 | Riedel .................. G06F 16/217 |
| 2010/0011368 | A1 | 1/2010 | Arakawa et al. |
| 2010/0179939 | A1 | 7/2010 | Rangarajan et al. |
| 2010/0241629 | A1 | 9/2010 | Tatemura et al. |
| 2011/0238637 | A1 | 9/2011 | Morozov |
| 2012/0254252 | A1* | 10/2012 | Jin ........................ G06F 16/221 707/797 |
| 2013/0275457 | A1 | 10/2013 | Lee et al. |
| 2015/0074080 | A1 | 3/2015 | Pidduck et al. |
| 2016/0063084 | A1 | 3/2016 | Han |
| 2016/0350392 | A1 | 12/2016 | Rice et al. |

OTHER PUBLICATIONS

Oracle, "Communication Data Model—Implementation and Operations guide", Release 12.1, E64551-03, published Jun. 2016 <URL: https://docs.oracle.com/cd/E64694_01/CDMOG/CDMOG.pdf>.

Oracle, "Data Warehousing Guide", 11gt Release 1, B28313-02, published Sep. 2007 <URL: https://docs.oracle.com/cd/B28359_01/server.111/b28313.pdf>.

Office Action for Australian Patent Application No. 2017236020 dated Mar. 5, 2019; 5 pgs.

Shamkant Navathe et al.: "Vertical partitioning algorithms for database design," ACM Transactions on Database Systems, vol. 9, No. 4, Dec. 1984; pp. 680-710.

ServiceNow, Inc.: "Table Extension", published on Feb. 14, 2017 (Wayback Machine); retrieved from Internet on Jul. 5, 2018 [URL: https://web.archive.org/web/20170214161112/http://wiki.servicenow.com/index.php?title=Table_Extension].

ServiceNow, Inc.: "Table Rotation", published on Feb. 3, 2017 (Wayback Machine); retrieved from internet on Jul. 5, 2018 [URL: https://web.archive.org/web/20170203055506/http://wiki.servicenow.com/index.php?title=Table_Rotation].

ServiceNow, Inc.: "Schema Map for Tables", published on Jan. 25, 2017 (Wayback Machine); retrieved from Internet on Jul. 6, 2018 [URL: https://web.archive.org/web/20170125160923/http://wiki.servicenow.com/index.php?title=Schema_Map_for_Tables].

ServiceNow, Inc.: "Understanding the sys audit Table", published on Feb. 4, 2017 (Wayback Machine); retrieved from internet on Jul. 6, 2018 [URL: https://web.archive.org/web/2017/0204012214/http://wiki.servicenow.com:80/index.php?title=Understanding_the_sys_audit_Table].

Freiddan et al.; "MySQL large database and large table design advice needed", published on May 17, 2010 (Wayback Machine); retrived from internet on Jul. 6, 2018 [URL: https://web.archive/org/web/20100517024039/https://artechnica.com/civis/viewtopic.php?f=20&t=1110242].

C. Jackson,; "Building Scalable Databases: Pros and Cons of Various Database Sharding Schemes", published Apr. 13, 2017 (Wayback Machine); retrieved from Internet Jul. 5, 2018 [URL: https://web.archive.org/web/20170413070735/http://www.25hoursaday.com/weblog/2009/01/16/BuildingScalableDatabasesProsAndConsOfVariousDatabaseShardingSchemes.aspx].

Examination Report for Australian Patent Application No. 2020256331 dated Mar. 31, 2021; 4 pgs.

* cited by examiner

TABLE-PER-PARTITION

CROSS-REFERENCE TO RELATED APPLICATION

This application claims priority to and the benefit of U.S. application Ser. No. 15/586,119, entitled "TABLE-PER-PARTITION", filed May 3, 2017, which is herein incorporated by reference in its entirety.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various types of data may be organized and stored in databases that are created, stored, and maintained on different types of computer-based systems. Examples of such databases include relational databases, which are well known and have been in use since the year 2000. Such databases may be used to store data ranging from personal information or data developed in large-scale industrial, commercial, and governmental contexts. Thus, such stored data sets may range from the trivially small in size to those that may encompass tens millions of records and data points, or more. As the number of records and the number of defined fields within a database grow in number however, the limitations of a given database architecture may impact the capability of a given database to be used efficiently.

By way of example, certain types of databases employ multiple tables to organize data, with different tables being configured (based on the fields defined for a respective table) to logically correspond to different portions of the data. The tables may themselves be logically associated one with another based on known relationships between fields of different tables, such as different tables having a common field or fields that can be used to relate the data stored in the different tables. The ability to join tables of data together in this manner allows different combinations of data fields to be accessed in a multi-table database to allow a user to flexibly query the data based on current needs.

However, while multi-table designs allow flexibility in use and implementation, they introduce weaknesses as well. For example, the need to join tables to perform some operations may be computationally expensive and/or slow to implement. Likewise, the use of multiple tables limits the ability to create an index spanning the tables, which also impacts the computational efficiency of performing multi-table operations.

BRIEF DESCRIPTION OF THE DRAWINGS

The description herein makes reference to the accompanying drawings, wherein like reference numerals refer to like parts throughout the several views.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in greater detail below, the present approach improves the query performance of a database in a manner that is transparent to a user. In particular, this approach creates separate partition tables based upon a threshold number of indexes allowed per table by a database program. In this manner, each partition table has available a full allotment of indexes. The partition tables, however, are not directly accessible to a user of the database, who may not even be aware of the partition tables. Instead, the client-facing aspect of the database is a logical model which may correspond to a single, main table with which the user interacts. Thus, queries or operations may be generated on the client side in the context of the logical model. A database or query layer can then, transparent to the user, translate the user generated requests into query language that addresses the proper partitions to generate a result set or otherwise perform a database operation. Changes to the non-client-facing aspects of the database, such as the partition tables, may be entirely transparent to a user, who can continue to interact with the logical model in the same manner regardless of changes made to the partition tables. In this manner, the present approach provides the benefits that may be associated with use of a single, large table in a database, while also providing a degree of indexing that would not be available if a single, large table were actually employed. In addition, the use of partition tables as discussed herein allow for commonly used fields of the database to be duplicated in multiple, or all, partition tables. In this manner, the number of joins needed to perform query operations may be reduced, thereby further improving query performance.

Figure 1:
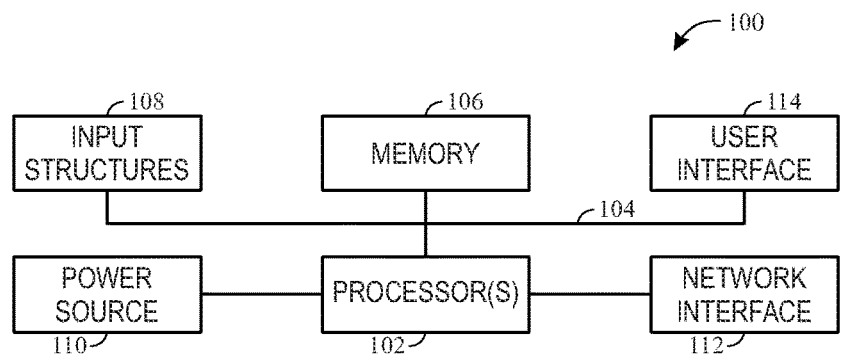
FIG. 1 is a block diagram of a computing device utilized in a distributed computing system of FIG. 1, in accordance with aspects of the present disclosure.

With this in mind, and by way of background, it may be appreciated that the present approach may be implemented using a processor-based system such as shown in FIG. 1.

Likewise, the databases to which the present approach applies may be stored and maintained on such a processor-based system.

Such a system may include some or all of the computer components depicted in FIG. 1. FIG. 1 generally illustrates a block diagram of example components of a computing device 100 and their potential interconnections or communication paths, such as along one or more busses. The computing device 100 may be an embodiment of a client, an application server, a database server, as discussed in greater detail below. As used herein, a computing device 100 may be implemented as a computing system that includes multiple computing devices and/or a single computing device, such as a mobile phone, a tablet computer, a laptop computer, a notebook computer, a desktop computer, a server computer, and/or other suitable computing devices.

As illustrated, the computing device 100 may include various hardware components. For example, the device includes one or more processors 102, one or more busses 104, memory 106, input structures 108, a power source 110, a network interface 112, a user interface 214, and/or other computer components useful in performing the functions described herein.

The one or more processors 102 may include processor capable of performing instructions stored in the memory 106. For example, the one or more processors may include microprocessors, system on a chips (SoCs), or any other performing functions by executing instructions stored in the memory 106. Additionally or alternatively, the one or more processors 102 may include application-specific integrated circuits (ASICs), field-programmable gate arrays (FPGAs), and/or other devices designed to perform some or all of the functions discussed herein without calling instructions from the memory 106. Moreover, the functions of the one or more processors 102 may be distributed across multiple processors in a single physical device or in multiple processors in more than one physical device. The one or more processors 102 may also include specialized processors, such as a graphics processing unit (GPU).

The one or more busses 104 includes suitable electrical channels to provide data and/or power between the various components of the computing device. For example, the one or more busses 104 may include a power bus from the power source 110 to the various components of the computing device. Additionally, in some embodiments, the one or more busses 104 may include a dedicated bus among the one or more processors 102 and/or the memory 106.

The memory 106 may include any tangible, non-transitory, and computer-readable storage media. For example, the memory 106 may include volatile memory, non-volatile memory, or any combination thereof. For instance, the memory 106 may include read-only memory (ROM), randomly accessible memory (RAM), disk drives, solid state drives, external flash memory, or any combination thereof. Although shown as a single block in FIG. 1, the memory 106 can be implemented using multiple physical units in one or more physical locations. The one or more processors 102 access data in the memory 106 via the one or more busses 104.

The input structures 108 provide structures to input data and/or commands to the one or more processor 102. For example, the input structures 108 include a positional input device, such as a mouse, touchpad, touchscreen, and/or the like. The input structures 108 may also include a manual input, such as a keyboard and the like. These input structures 108 may be used to input data and/or commands to the one or more processors 102 via the one or more busses 104. The input structures 108 may alternatively or additionally include other input devices. For example, the input structures 108 may include sensors or detectors that monitor the computing device 100 or an environment around the computing device 100. For example, a computing device 100 can contain a geospatial device, such as a global positioning system (GPS) location unit. The input structures 108 may also monitor operating conditions (e.g., temperatures) of various components of the computing device 100, such as the one or more processors 102.

The power source 110 can be any suitable source for power of the various components of the computing device 100. For example, the power source 110 may include line power and/or a battery source to provide power to the various components of the computing device 100 via the one or more busses 104.

The network interface 112 is also coupled to the processor 102 via the one or more busses 104. The network interface 112 includes one or more transceivers capable of communicating with other devices over one or more networks (e.g., a communication channel). The network interface 112 may provide a wired network interface, such as Ethernet, or a wireless network interface, such an 802.11, Bluetooth, cellular (e.g., LTE), or other wireless connections. Moreover, the computing device 100 may communicate with other devices via the network interface 112 using one or more network protocols, such as Transmission Control Protocol/Internet Protocol (TCP/IP), power line communication (PLC), WiFi, infrared, and/or other suitable protocols.

A user interface 114 may include a display that is configured to display images transferred to it from the one or more processors 102. The display may include a liquid crystal display (LCD), a cathode-ray tube (CRT), a light emitting diode (LED) display, an organic light emitting diode display (OLED), or other suitable display. In addition and/or alternative to the display, the user interface 114 may include other devices for interfacing with a user. For example, the user interface 114 may include lights (e.g., LEDs), speakers, and the like.

Figure 2:
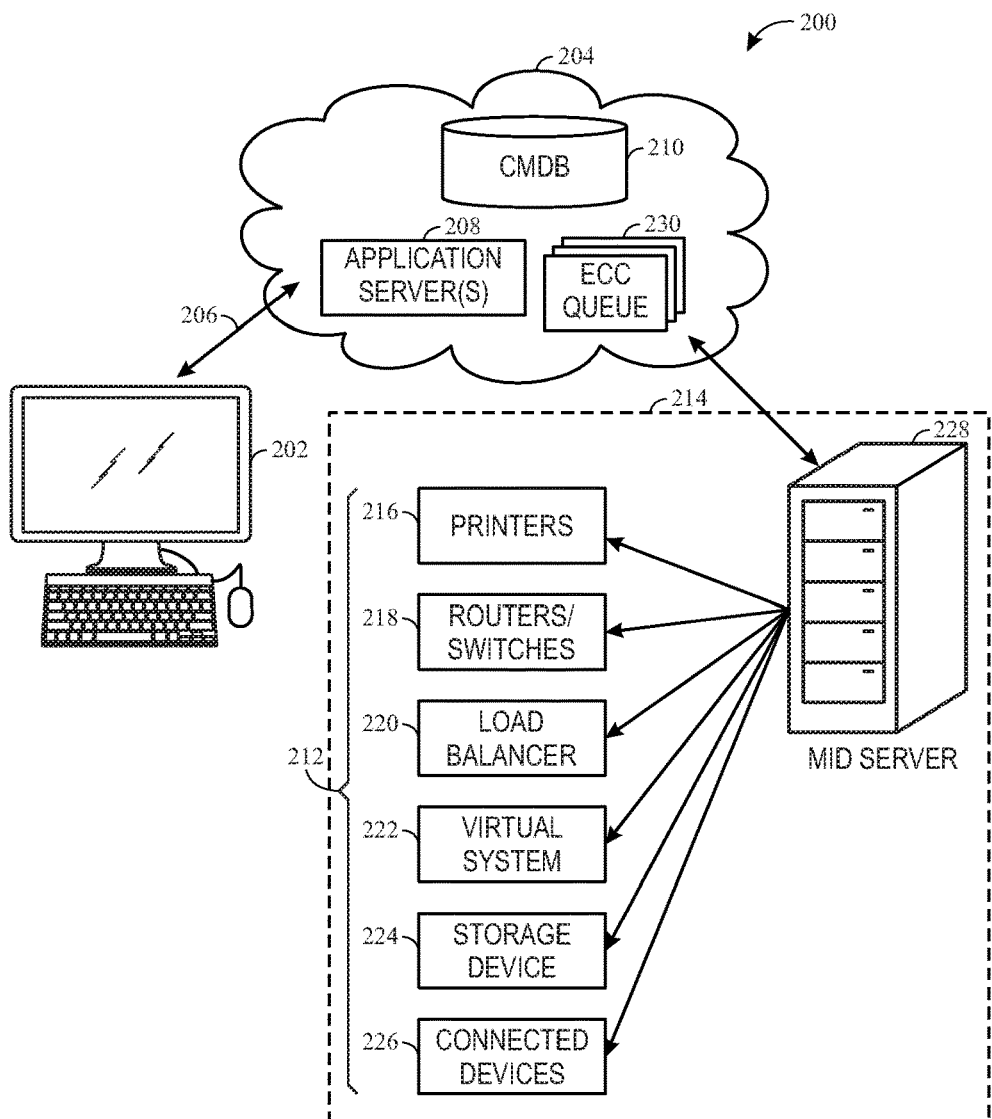
FIG. 2 is a block diagram of a distributed computing system, in accordance with aspects of the present disclosure.

A real-world context in which processor-based systems, such as the computing device 100 of FIG. 1, may be employed to implement the present approach, is shown in FIG. 2. In this example, a number of computing devices 100 are employed to implement a distributed computing framework 200, shown as a block diagram in FIG. 2, in which certain of the constituent devices may maintain or interact with a database in accordance with the approach discussed herein.

With this in mind, and turning to FIG. 2, a client 202 communicates with a platform 204, such as a cloud service platform, over a communication channel 206. The client 202 may include any suitable computing system. For instance, the client 202 may include one or more computing devices 100, such as a mobile phone, a tablet computer, a laptop computer, a notebook computer, a desktop computer, or any other suitable computing device or combination of computing devices. The client 202 may include client application programs running on the computing devices. The client 202 can be implemented using a single physical unit or a combination of physical units (e.g., distributed computing) running one or more client application programs. Furthermore, in some embodiments, a single physical unit (e.g., server) may run multiple client application programs simultaneously.

The platform 204 may include any suitable number of computing devices (e.g., computers) in one or more locations that are connected together using one or more networks. For instance, the platform 204 may include various computers acting as servers in datacenters at one or more geographic locations where the computers communicate using network and/or Internet connections. The communication channel 206 may include any suitable communication mechanism for electronic communication between the client 202 and the platform 204. The communication channel 206 may incorporate local area networks (LANs), wide area networks (WANs), virtual private networks (VPNs), cellular networks (e.g., long term evolution networks), and/or other network types for transferring data between the client 202 and the platform 204. For example, the communication channel 206 may include an Internet connection when the client 202 is not on a local network common with the platform 204. Additionally or alternatively, the communication channel 206 may include network connection sections when the client and the platform 204 are on different networks or entirely using network connections when the client 202 and the platform 204 share a common network. Although only a single client 202 is shown connected to the platform 204, it should be noted that platform 204 may connect to multiple clients (e.g., tens, hundreds, or thousands of clients 202).

Through the platform 204, the client 202 may connect to various devices with various functionality, such as gateways, routers, load balancers, databases, application servers running application programs on one or more nodes, or other devices that may be accessed via the platform 204. For example, the client 202 may connect to an application server 208 and/or one or more databases 210 via the platform 204. The application server 208 may include any computing system, such as a desktop computer, laptop computer, server computer, and/or any other computing device capable of providing functionality from an application program to the client 202. The application server 208 may include one or more application nodes running application programs whose functionality is provided to the client via the platform 204. The application nodes may be implemented using processing threads, virtual machine instantiations, or other computing features of the application server 208. Moreover, the application nodes may store, evaluate, or retrieve data from the databases 210 and/or a database server.

The databases 210 may contain a series of tables containing information about assets and enterprise services controlled by a client 202 and the configurations of these assets and services. In one such example, a database maintaining such asset and service data may be referred to as a configuration management database (CMDB). Such a CMDB database may have over 500 tables and more than 7 organizational levels. In such an implementation, the assets and services include configuration items (CIs) 212 that may be computers, other devices on a network 214 (or group of networks), software contracts and/or licenses, or enterprise services. The CIs 212 may include hardware resources (such as server computing devices, client computing devices, processors, memory, storage devices, networking devices, or power supplies); software resources (such as instructions executable by the hardware resources including application software or firmware); virtual resources (such as virtual machines or virtual storage devices); and/or storage constructs (such as data files, data directories, or storage models). As such, the CIs 212 may include a combination of physical resources, logical resources, or virtual resources. For example, the illustrated example of CIs 212 includes printers 216, routers/switches 218, load balancers 220, virtual systems 220, storage devices 224, and/or other connected devices 226. The other connected devices 226 may include clusters of connected computing devices or functions such as data centers, computer rooms, databases, or other suitable devices. Additionally or alternatively, the connected devices 2269 may include facility-controlling devices having aspects that are accessible via network communication, such as heating, ventilation, and air conditioning (HVAC) units, fuel tanks, power equipment, and the like. The databases 210 may include information related to CIs 212, attributes (e.g., roles, characteristics of elements, etc.) associated with the CIs 212, and/or relationships between the CIs 212.

As noted above, in one implementation, the databases 210 may include a CMDB that may store the data concerning CIs 212 mentioned above along with data related various IT assets that may be present within the network 214. In addition to the databases 210, the platform 104 may include one or more other database servers configured to store, manage, or otherwise provide data for delivering services to the client 202 over the communication channel 206. The database server may include one or more additional databases that are accessible by the application server 208, the client 202, and/or other devices external to the additional databases. The additional databases may be implemented and/or managed using any suitable implementations, such as a relational database management system (RDBMS), a time series database management system, an object database, an extensible markup language (XML) database, a management information base (MIB), one or more flat files, and/or or other suitable non-transient storage structures. In some embodiments, more than a single database server may be present in the distributed computing framework 200. Furthermore, in some embodiments, the platform 204 may have access to one or more databases external to the platform 204 entirely.

In the depicted topology, access to the CIs 212 from the platform 204 is enabled via a management, instrumentation, and discovery (MID) server 228 via an external communications channel queue 230. The MID server 126 may include an application program (e.g., Java application) that runs as a service (e.g., Windows service or UNIX daemon) that facilitates communication and movement of data between the platform 204 and external applications, data sources, and/or services. The MID service 228 may be executed using a computing device (e.g., server or computer) on the network 214 that communicates with the platform 204. The MID server 228 may periodically or intermittently use discovery probes to determine information on devices connected to the network 214 and return the probe results back to the platform 204, such as to create or update a database 210 configured as a CMDB. In the illustrated embodiment, the MID server 228 is located inside the network 214 thereby alleviating the use of a firewall in communication between the CIs 212 and the MID server 228. However, in some embodiments, a secure tunnel may be generated between a MID server 228 running in the platform 204 that communicates with a border gateway device of the network 214.

Although the distributed computing framework 200 is described as having the application servers 208, the databases 210, the communications channel 230, the MID server 228, and the like, it should be noted that the embodiments disclosed herein are not limited to the components described as being part of the framework 200. Indeed, the components depicted in FIG. 2 are merely provided as example components and the framework 200 should not be limited to the components described herein.

Further, it should be noted that server systems described herein may communicate with each other via a number of suitable communication protocols, such as via wired communication networks, wireless communication networks, and the like. In the same manner, the client 202 may communicate with a number of server systems via a suitable communication network without interfacing its communication via the platform 204.

With the preceding system and device level background in mind, the present approach relates to a database structure that may be implemented on a processor-based system and in a distributed environment as discussed with respect to FIGS. 1 and 2. To facilitate explanation and to provide a useful real-world context, a database in the form of a CMDB, as discussed above, will be used as an example to describe both a conventional table organization and query approach as well as the present approach, thereby providing a useful contrast. However, it should be understood that the present approach may be applied to other suitable databases and is not limited to CMDB implementations.

As discussed herein, a database may consist of a number of tables, which are often defined based on some logical characteristic common to the records stored in the table (e.g., address information in an address table of a mailing database, error events in an error table of an event log, vehicles in a vehicle table of a registration database, and so forth). Each table in turn is characterized by a number of records for which one or more different types of data are stored in respective fields of the table. By way of example, in a vehicle registration database one table may have a record for each registered vehicle, with each vehicle record having associated fields for storing information specific to the respective vehicle (e.g., vehicle year, make, model, color, identification number, and so forth). In such an example, other tables may exist in the same database containing owner information, accident information, repair history, recall notices and so forth, with each table having its own set of records which in turn have respective fields related to the records within that table. In a relational database context, these tables may be linked together based on known relationships between tables (e.g., between owners and vehicles), allowing the stored data to be accessed or manipulated in useful ways.

In addition, each table may have multiple fields that are indexed or that serve as indexes, such that the table is more readily searched or manipulated when referenced by an indexed field. For the purpose of explanation and visualization, such a table may conceived of as records in rows within the table (i.e., run vertically within the table) and the different fields of data for each record are columns (i.e., run horizontally within the table). As will be appreciated however, such directionality and two-dimensionality is an arbitrary convention and should not be viewed as limiting.

In the case of a configuration management database (CMDB), as discussed by way of example herein, the database stores information about assets and enterprise services of an entity and the configurations of these assets and services. The asset and service data stored in a CMDB typically includes configuration items (CIs) that may relate to hardware resources (such as server computing devices, client computing devices, processors, memory, storage devices, networking devices, or power supplies); software resources (such as instructions executable by the hardware resources including application software or firmware); virtual resources (such as virtual machines or virtual storage devices); and/or storage constructs (such as data files, data directories, or storage models).

In a conventional approach, the tables for a CMDB may be logically characterized based on classes (either abstract or concrete) corresponding to the type of data in question such that a separate structured query language (SQL) table exists for each logical class. As used herein, such separate SQL tables may also be referred to as separate physical tables, though it should be appreciated that the tables are logical constructs.

Figure 3:
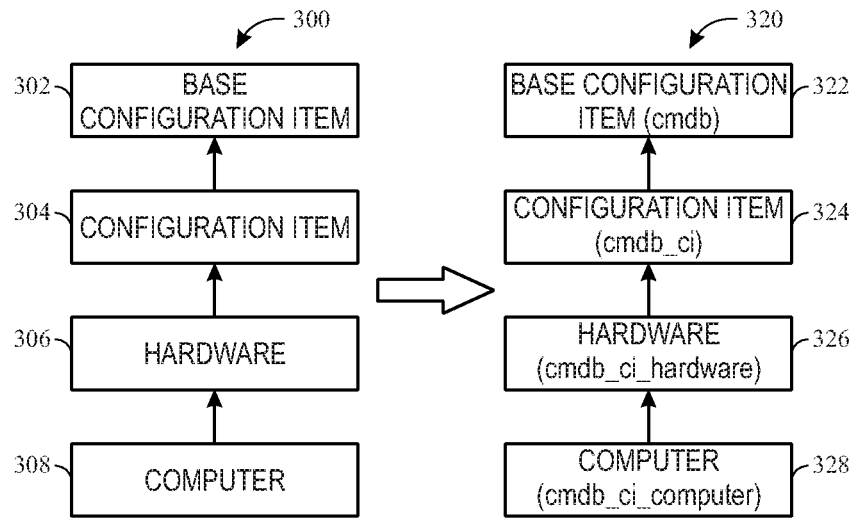
FIG. 3 depicts a class structure and a corresponding set of tables.

With respect to the logical class organization in a CMDB, turning to FIG. 3, a conceptual example of an arrangement of logical classes 300 corresponding to computer configuration items (CIs) is depicted. In this example, logical class examples corresponding to base configuration items 302, configuration items 304, hardware 306, and computers 308 are shown on the left. On the right, these logical classes 300 are organized as class-based tables 320, namely a base configuration item table (cmdb) 322, a configuration item table (cmdb_ci) 324, a hardware table (cmdb_ci_hardware) 326, and a computer table (cmdb_ci_computer) 328. Each table 320 may have records corresponding to a system identifier (sys id) or other suitable identifier for those systems falling within the respective logical class and corresponding fields of the respective class. By way of example, the base configuration item table 322 may have fields for a system identifier, system name, who the system is owned by, a system class name, and so forth. Similarly, the configuration item table 324 may have fields for system identifier, IP address, and so forth; the hardware table 326 may have fields for system identifier, hardware status, and so forth; and the computer table 328 may have fields for system identifier, operating system (OS), OS version, and so forth. In this manner, information appropriate for different organizational levels of the CMDB may be stored for use.

In the table-per-class approach described above, operations performed on the CMDB (such as create, read, update, delete (CRUD) operations), may be performed using a query based on structure query language (SQL) protocols. As part of executing a query in a table-per-class context as presently described, each table having a field specified in the query must be joined so as to identify all data specified by the query, which may result in multiple joins of different tables being performed to build the result set.

For example, a query to retrieve all computers made by "Manufacturer A" running "OS A" may be sent by a client 202 to a respective database manager as: http://[servicenow]/cmdb_ci_computer_list.do?sysparm_query=manufacturer=Manufacturer_A^os=OS_A. With the database manager or database layer, such code may be parsed as:

```
var gr = new GlideRecord("cmdb_ci_computer");
gr.addQuery("manufacturer", "Manufacturer A");
gr.addQuery("os", "OS A");
gr.orderBy("name", "os_version");
gr.query( );
``` to execute the query operation. The SQL instruction in turn generated for this query is:

```
SELECT * FROM ((((cmdb_ci_computer cmdb_ci_computer0 INNER
  JOIN cmdb cmdb0 ON cmdb_ci_computer0.'sys_id' = cmdb0.'sys_id' )
  INNER JOIN cmdb_ci cmdb_ci0 ON cmdb_ci_computer0.'sys_id' =
  cmdb_ci0.'sys_id' ) INNER
  JOIN cmdb_ci_hardware cmdb_ci_hardware0 ON cmdb_ci_computer0.
  'sys_id' = cmdb_ci_hardware0.'sys_id' )) WHERE cmdb0.'manufacturer'
  = 'Manufacture A' AND cmdb_ci_computer0.'os' = 'OS A' ORDER BY
  cmdb0.'name', cmdb_ci_computer0.'os_version'.
```

The WHERE clause defining the search fields specifies multiple fields (here, cmdb.'manufacturer' and cmdb_ci_computer.'os') across different tables (i.e., different physical tables). Similarly, the ORDER clause specifies multiple fields (here, cmdb.'name' and cmdb_ci_computer.'os_version') across different tables. Thus, joins of different tables are required to build the result set.

Similarly, in a write query example within a table-per-class context, similar issues arise. For example, the write query code used to create a new record corresponding to a Manufacturer A brand computer running OS A may be:

```
var gr = new GlideRecord("cmdb_ci_computer");
gr.name = "localhost";
gr.manufacturer = "Manufacturer A";
gr.os = "OS A";
gr.insert( );
``` which gives rise to SQL script:

```
INSERT INTO cmdb(sys_id, name, manufacturer, ...) VALUES('x',
  'localhost', 'Manufacturer A', ...)
INSERT INTO cmdb_ci(sys_id, ...) VALUES('x', ...)
INSERT INTO cmdb_ci_hardware(sys_id, ...) VALUES('x', ...)
INSERT INTO cmdb_ci_computer(sys_id, os, ...) VALUES ('x',
  'OS A')
```

As will be appreciated, in this example, as in the preceding, multiple fields (here, cmdb.'manufacturer' and cmdb_ci_computer.'os") across different tables are accessed by the write query and an INSERT operation is performed in each table (i.e., base configuration item table (cmdb) 322, configuration item table (cmdb_ci) 324, hardware table (cmdb_ci_hardware) 326, and computer table (cmdb_ci_computer) 328.

With the preceding examples in mind, certain issues associated with table-per-class approaches may be apparent. One issue is the need to join tables to build a result set in response to a query that involves fields in multiple, different tables. In certain contexts, such as MySQL®, such table joins are computationally expensive and/or slow for large result sets and may also present scalability issues. However, it is typically not possible to create a single index across multiple tables. For example, the write query example above involves inserting a system identifier in each of the class table of the example, even those (e.g., cmdb_ci and cmdb_ci_hardware) that are not otherwise implicated in the query so that multiple index records are generated linking the new record across the database.

One alternative might be a single table encompassing a given organization or structure of logical classes. Due to being a single table, such an approach flattens storage into a single level and also avoids the issue of having to join tables to build a result set in response to a query and would avoid the issue of needing to replicate indexes across multiple tables, instead allowing a single index to be employed. The scale of such a table, however, would be problematic due various constraints present in existing database architectures. Further, such an approach is subject to the storage limitations for a single table. For example, a MySQL® database limits table size to 1,000 columns or less and to no more than 64 indexes. For databases, that would have more than 1,000 columns and/or more than 64 indexed fields, such as many CMDB databases, these constraints would likely render such a single table approach infeasible.

Figure 4:
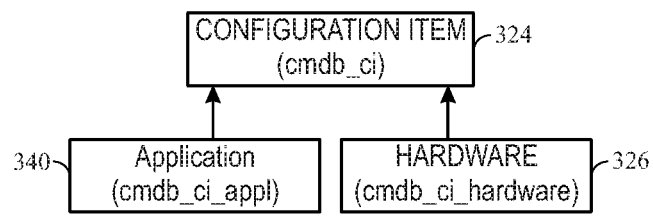
FIG. 4 depicts an example of a class organization with non-overlapping tables, in accordance with aspects of the present disclosure.

With respect to column limitations, one approach to address this limitation may be to share fields from non-overlapping sibling tables. An example of non-over-lapping sibling tables is shown in FIG. 4 in the form of the hardware table (cmdb_ci_hardware) 326 and an application table (cmdb_ci_appl) 340, both of which are organized with respect to the configuration item table (cmdb_ci) 324.

Figure 5:
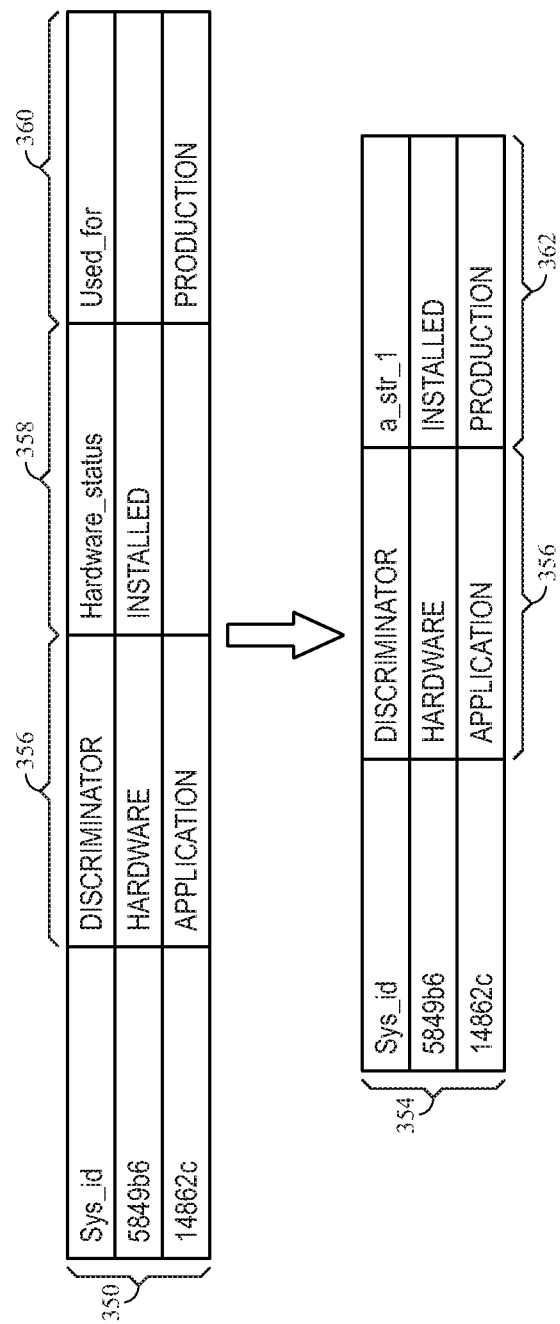
FIG. 5 depicts table arrangements in which non-overlapping fields are not shared (top) and in which non-overlapping fields are shared (bottom) to conserve columns, in accordance with aspects of the present disclosure.

Turning to FIG. 5 an example based on these sibling tables and how their non-overlapping fields may be leveraged to reduce total columns is shown. In particular, the top table subset 350 shows two records in a single table approach where each field of each table class is maintained in the common table. A Discriminator field 356 identifies which logical class each record corresponds to. As shown in this example, records corresponding to "Hardware" include a "Hardware_status" field 358 and records corresponding to "Application" have a "Used_for" field 360, each of which will be empty for records of the other type.

As shown in the bottom table subset 354, such non-overlapping fields may be combined into a shared field 362 (here denoted as "a_str_1") which is used based on the context provided by the contents of the "Discriminator" field 356. As will be appreciated, non-overlapping fields shared in this manner will have a data type (e.g., text in this example) and field parameters defined for the shared field 362 consistent with or common to the shared data. In this manner, the total number of columns for a single table in the CMDB context, can be significantly reduced, potentially to within the column limitations imposed by the database program.

Limitations based on the number of indexes in a table, however, are not addressed by such field sharing, and may make a single table approach untenable for a large dataset. In particular, certain database programs impose a limitation on the number of indexes that may be present in each table. MySQL®, for example, imposes a 64 index limitation on each table. For a large, single table database, such as a CMDB, such an index limitation is likely to be unworkable in terms of query inefficiency and speed.

The present approach addresses this issue by creating a table construct that logically appears as a single table to a user, but which is composed of multiple tables (i.e., multiple distinct physical tables) each capable of indexing a number of fields up to the maximum allowed by the database program (e.g., 64 indexes). In one such implementation, a single table, as discussed above, may be the initial state, with storage tables (i.e., partitions) added as needed. As in the preceding single table example, storage is flattened into a single level and joins are avoided or reduced relative to conventional table-per-class approaches.

This approach, denoted herein as table-per-partition, involves partitioning a main table into two or more tables when an index boundary (e.g., 64 indexes) is exceeded such that each partition table is a full table (i.e., a physical table) in the context of the database program. Each partition table, therefore, has available a full allotment of indexes consistent with what the underlying database program allows. Thus, a single, or main, table may be employed up to a point when a leaf class exceeds an index threshold on the main table, at which point a second partition in the form of a new table is created. In this scenario, columns that need indexes over the threshold go onto the second partition. The process may be repeated once the number of indexes on the second partition reaches the index threshold allowed by the database program.

Figure 6:
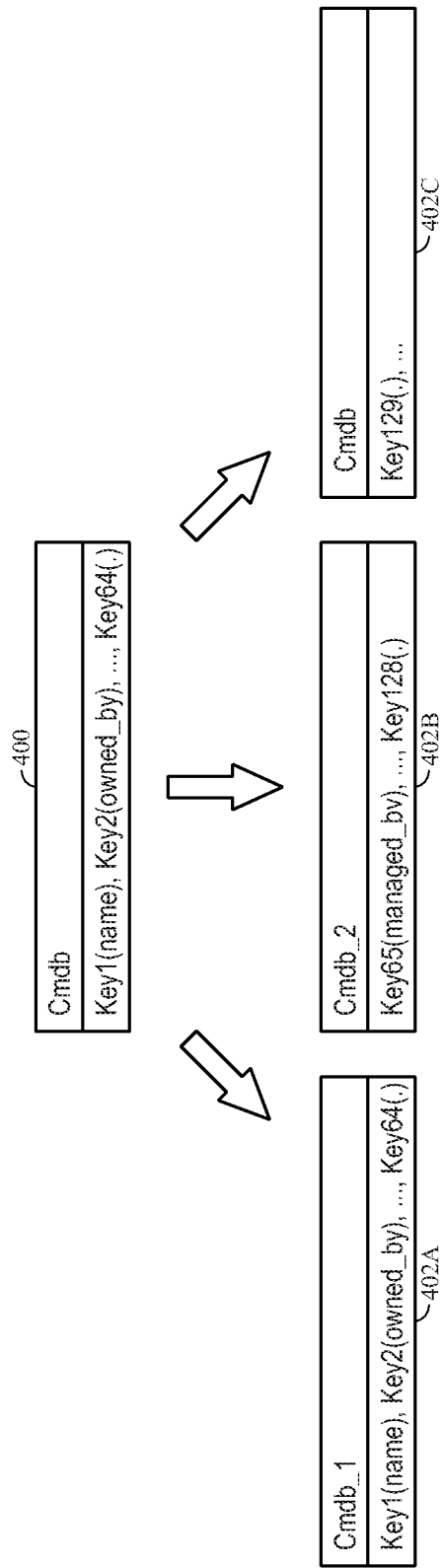
FIG. 6 depicts a series of partition tables generated based on an index threshold, in accordance with aspects of the present disclosure.

This approach is diagrammatically depicted in FIG. 6, where an initial CMDB table 400 is depicted. In this example, the CMDB table 400 has up to 64 indexes, with the first index denoted Key1(name), the second index denoted Key2(owned_by), and so forth up to the 64$^{th}$ index denoted Key64(•). When a 65$^{th}$ index (here, Key65 (managed_by)) is assigned, the main or initial CMDB table 400 is partitioned into first and second partition tables, CMDB_1 (402A) and CMDB_2 (402B), each being a distinct table from the perspective of the database program and having available a full allotment of indexes. The first partition table 402A (CMDB_1) in this example has the first 64 indexes present in the main CMDB table 400, while the second partition table 402B (CMDB_2) has the second set of 64 indexes (i.e., Key65 through Key 128). Thus, in this example, the 65$^{th}$ index (Key65 (managed_by) becomes the first index in the second partition table. When a 129$^{th}$ index is assigned, third partition table 402C (CMDB_3) is created and populated until the next index threshold is reached.

As a practical matter, it should be noted that different partition tables 402 may, to help improve query response, have duplicates of certain fields. For example, commonly accessed fields (e.g., master fields) may be copied and dynamically synchronized (such as using transactional writes) across partition tables 402. In particular, replicating such commonly referenced fields across partition tables 402 may increase the likelihood that all fields referenced by a given query can be satisfied by accessing a single partition table, or may otherwise reduce the number of partition tables 402 needed to generate a result set. By way of example, in one implementation all sys_* fields may be synchronized to all partitions. Likewise, display values (that aren't reference fields) and/or commonly queried fields may benefit from such replication, such as by reducing join operations in response to queries.

By way of example, assuming a first partition table 402A (CMDB_1) has fields for "system identifier" and "name" while second partition table 402B (CMDB_2) has fields for "system identifier" and "managed_by". Conventionally, a query referencing or otherwise implicating the "name" and "managed_by" fields would require that a join be performed on the first and second partition tables 402A and 402B. However, if such a field combination is common, the "name" field may be duplicated and synchronized in second partition table 402B such that this table now has fields for "system identifier", "name", and "managed_by". Once done, future queries referencing the "name" and "managed_by" fields may be performed using only the second partition table 402B, without the need to join additional tables.

In this manner, replicating referenced fields across partition tables 402 may reduce or eliminate the needs for joins in generating a result set for a given query, thereby improving performance with respect to the query. In practice the fields of a given partition table 402 may be pre-configured or dynamically adjusted, such as based on query history or on predictions related to the other fields in a given partition table 402, to include fields commonly included in queries with respect to the other fields in a partition table 402. In this manner, the responsiveness to client queries may be enhanced by minimizing or eliminating joins when generating a result set for a query.

Figure 7:
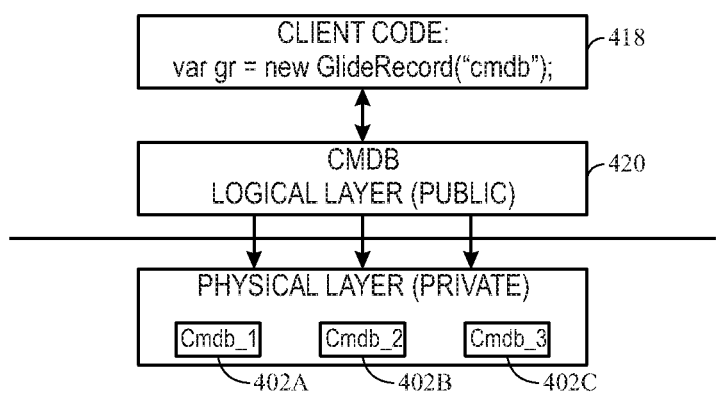
FIG. 7 depicts client-facing and non-client-facing aspects of a table-per-partition implementation, in accordance with aspects of the present disclosure.

This approach provides certain advantages over other approaches discussed herein. For example, turning to FIG. 7, the database in question may be presented as a single, logical construct (e.g., a single table) from the perspective of a client or user so that queries may be directed to the main table as usual. For example, in CMDB context, the user or client queries 418 may still reference a single, a logical model 420 of the main CMDB table, without reference to, or knowledge of, the underlying partition tables 402 into which the CMDB table is actually, i.e., physically, divided. That is, a or client-facing logical model 420 or construct corresponding to the CMDB as a single table is accessible to and addressed by the client 202. This client-facing logical model 420 is exposed to the user code and exceeds the underlying limitations of the database program, such as related to the number of indexes. SQL generation in response to the client code 418 is transparent to the client 202 and resolves to the underlying partition tables 402 transparently to the user such that the partition tables 402 are hidden from user and are never exposed directly to the user code, which instead references the logical model 420 of the CMDB.

With the preceding in mind, the following query examples illustrate the table-per-partition concept as it may be implemented in a real-world context. In the first example, client code for a read query to identify computer CI's named "localhost" may be given by:

```
var gr = new GlideRecord("cmdb");
gr.addQuery("name", "localhost");
gr.query( );
```

Thus, the user specifies only the public facing logical model 420 corresponding to the CMDB main table, without knowledge of or reference to the partition tables 402 underlying the logical model. In the database layer, this query code from the user may be processed to generate a corresponding SQL request. The SQL generation step resolves the partition tables in a manner transparent to the user such that the corresponding SQL query used to generate the result set properly references the appropriate partition tables 402, such as:

```
SELECT * FROM cmdb_1
INNER JOIN cmdb_2 ON cmdb_2.'sys_id' = cmdb_1.'sys_id'
WHERE cmdb_1.'name' = 'localhost'
``` where partition tables CMDB_1 and CMDB_2 are accessed to perform the query without the user accessing or referencing these partition tables in their code.

Similarly, in a second example corresponding to examples presented earlier, a read query is formulated to identify computers of a specified manufacture and running a specified OS. Client code referencing only the client-facing, logical model 420 of the CMDB may be given by:

```
GlideRecord gr = new GlideRecord("cmdb");
gr.addQuery("manufacturer", "Manufacturer A");
gr.addQuery("name", "os_version");
gr.query( );
```

In the database layer, this query code from the user may be processed to generate a corresponding SQL request that is resolved to reference the relevant partition tables 402 (e.g., CMDB_1 and CMDB_2), such as:

```
SELECT * FROM cmdb_1
INNER JOIN cmdb_2 ON cmdb_2.'sys_id' = cmdb_1.'sys_id'
WHERE cmdb_2.'manufacturer' = 'Manufacturer A'
ORDER BY cmdb_1.'name', cmdb_1.'os_version'
```

In a final example, a write query is formulated to create a new record for a computer manufactured by a specified manufacturer and running a specified OS. As in the preceding examples, the client code reference only the client-facing, logical model 420 of the CMDB, as given by:

```
var gr = new GlideRecord("cmdb_ci_computer");
gr.name = "localhost";
gr.manufacturer = "Manufacturer A";
gr.os = "OS A";
gr.insert( );
```

As in the other examples, in the database layer this client query code may be processed to generate a corresponding SQL request that is resolved to reference the relevant partition tables 402 transparent to the user:

```
INSERT INTO cmdb_1(sys_id, name, os) VALUES('x', 'localhost', 'OS A')
INSERT INTO cmdb_2(sys_id, manufacturer) VALUES('x', 'Manufacturer A')
```

By way of further explanation, the following examples contrast comparable query operations done in a table-per-class and a table-per-partition approach as described herein.

However, prior to presenting such comparison examples, it may be useful to note differences in the logical schema metadata as it may be employed relative to the table-per-class and table-per-hierarchy approaches. For example, in a conventional table-per-class scheme, sys_db_object is a record for each logical class (i.e., table) in the system and defined the logical class structure as well as specifying the extension model. In one implementation of the present table-per-partition approach, sys_db_object may still be used to determine the logical class structure, but is irrelevant to the storage organization. Likewise, in a table-per-partition approach, sys_db_object may additionally specify partitions.

In the table-per-class scheme, sys dictionary typically is a record for each logical element on a table. In one implementation of the table-per-partition approach, sys_dictionary may still be used to specify logical element, but due to duplication of common elements between partitions a table may have an entry for every element.

In the table-per-class scheme, sys_storage_alias maps logical elements to storage aliases on an actual RDBMS table. Likewise, sys_storage_table_alias maps logical table names to storage table names. In one implementation of a table-per-partition approach, sys_storage_alias may still be used to map logical elements to a storage alias, but may include a new field, e.g., storage_table_names, used to specify which partition hosts the storage alias. In certain implementations, however, synchronized fields on multiple or all partitions may not need such a reference.

In addition, the table-per-partition approach may employ logical schema metadata not found in the table-per-class approach. For example, the table-per-partition approach may need to define the additional storage partitions for a root table's structure and may employ sys_table_partition or something comparable to allow such specification.

With the preceding distinctions in mind, and turning back to the comparative examples, in a first example, an insert operation is compared. In an example of a table-per-class operation to INSERT a record to cmdb_ci_computer for example, is actually an insert to all implicated component tables (i.e., it is a composite table WRITE operation) such as:

```
INSERT INTO cmdb...
INSERT INTO cmdb_ci...
INSERT INTO cmdb_ci_hardware...
INSERT INTO cmdb_ci_computer...
```

This is in contrast to a comparable query in the table-per-partition approach, where an INSERT would actually be an insert to all N partition tables:

```
INSERT INTO cmdb...
INSERT INTO cmdb$par1...
INSERT INTO cmdb$parN...
```

Similarly, an update to cmdb_ci_computer in a table-per-class scheme involves updating any component table hosting a changed field, as so:

```
UPDATE cmdb SET sys_updated_on = '...', sys_updated_by '...'
    WHERE sys_id ='123'
UPDATE cmdb_ci_computer SET ram = '512' WHERE sys_id = '123'
```

In constrast, a comparable operations performed in a table-per-partition scheme as discussed herein involved updating any partition table hosting a changed field:

```
UPDATE cmdb SET sys_updated_on = '...', sys_updated_by = '...'
    WHERE sys_id = '123'
UPDATE cmdb$par1 SET ram = '512' WHERE sys_id = '123'
```

A comparison of a deletion operation also illustrates distinctions. A deletion to cmdb_ci_computer in a table-per-class scheme involved deleting from each implicated component tables such as:

```
DELETE FROM cmdb ...
DELETE FROM cmdb_ci...
DELETE FROM cmdb_ci_hardware...
DELETE FROM cmdb_ci_computer...
```

This is in contrast to a comparable query in the table-per-partition approach, where a DELETE would be from all N partition tables:

```
DELETE FROM cmdb...
DELETE FROM cmdb$par1...
DELETE FROM cmdb$parN...
```

In a final example illustrating differences in comparable table-per-class and table-per-hierarchy queries, and returning to a working example context, queries to select records having an operational status of "Operational", an overall status of "Installed", a hardware status of "Installed" and running an operating system of "OS A", in a table-per-class scheme may be constructed as:

```
SELECT count(*)
FROM cmdb_ci_computer INNER JOIN
    cmdb ON cmdb_ci_computer.`sys_id` = cmdb.`sys_id`
INNER JOIN
    cmdb_ci ON cmdb_ci_computer.`sys_id` =
cmdb_ci.`sys_id` INNER JOIN
    cmdb_ci_hardware ON cmdb_ci_computer.`sys_id` =
        cmdb_ci_hardware.`sys_id`
    WHERE cmdb.`install_status` = 1 AND
        cmdb_ci.`operational_status` = 1 AND
        cmdb_ci_computer.`os` = 'OS A' AND
        cmdb_ci_hardware.`hardware_status` = 'installed'
```

Conversely, in the present table-per-partition scheme the comparable query is shortened and the INNER JOINS avoided:

```
SELECT count(*)
FROM cmdb
WHERE cmdb.`sys_class_path` LIKE '/!!/!2/!(%' AND
    cmdb.`operational_status` = 1 AND
    cmdb.`install_status` = 1 AND
    cmdb.`a_str_15` = 'installed' AND
    cmdb.`a_str_17` = 'OS A'
```

As may be noted, in the present example, the table-per-partition query also employs a "class path" type discriminator which conveys both the logical class and path of each record. Further discussion of the use of class path based discriminator can be found in "CLASS PATH BASED DATABASE OPERATIONS", filed by SERVICENOW INC. on the same day as the present disclosure and incorporated herein by reference in its entirety for all purposes.

As will be appreciated from the preceding examples, a table-per-partition approach may still utilize joins across the partition tables 402 to the extent that fields referenced by a query are in different partition tables 402. However, unlike table-per-class approaches, the present approach, as described above, allows for common fields to be added to multiple partition tables so as to reduce or eliminate the number of joins performed to execute common queries. As noted above, such an approach may include duplicating fields commonly referenced by queries onto each of or some subset of, the partition tables. That is, the fields in a given partition table are not defined by a logical class but may be selected based on common usage and/or dynamically adjusted so as to improve query performance (by reducing or eliminating joins), thereby improving the efficiency or speed of CRUD operations.

With the preceding in mind, it may be appreciated that, in certain contexts it may be desirable to migrate stored data from a table-per-class scheme to a table-per-partition scheme. One example of such a migration may include some or all of the following described steps, as well as other steps depending on the context of the migration. By way of example, in one such migration the data to be migrated may initially be prepared and/or sanitized, such as to: de-parent reparenting backup tables, remove duplicate elements in the cmdb (or other database) organization, and/or remove orphaned rows. A target structure or organization may be built in memory, such as by: assigning class codes to all tables, building an in-memory map of existing elements and indexes, assigning storage aliases to all elements, reducing indexes to a minimal or reduced set (e.g., removing redundant indexes), determining a number of partitions based on the number of projected indexes, and distributing columns to allocated partitions based on the indexes. A target schema may then be created, which may involve recording dictionaries and aliases.

Data may be copied. This may involve creating triggers copying data in the existing structure (i.e., table-per-class) to the target storage structure. Data may be copied per table, with the copy operations parallelized to the extent possible. In one implementation, the old data structure maybe hot swapped with the new and prior storage caches invalidated. The old data structure may be backed up and stored for some time interval. Copy triggers may then be removes and the existing cache flushed. The migrated data may then undergo a validation process if desired.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
one or more hardware processors; and
a non-transitory memory storing a plurality of non-identical tables that comprise a plurality of fields, wherein the plurality of non-identical tables is referenced by a query layer that is not directly addressable by a user and is addressable via a logical model of a configuration management database (CMDB), and wherein the non-transitory memory stores instructions that, when executed by the one or more hardware processors, cause the one or more hardware processors to perform operations comprising:
identifying a plurality of queries based on usage;
determining that a first set of fields of the plurality of fields is commonly accessed by the plurality of queries at a higher frequency than a second set of fields of the plurality of fields;
generating a new table accessible via the query layer and comprising the first set of fields, wherein at least one field is duplicated between an existing table and the new table, wherein the new table reduces a number of joins performed when a query of the plurality of queries is run in comparison to when the query is run against the plurality of non-identical tables;

accessing the new table to run the query, wherein the query is run without joining the existing table such that the at least one field is changed in the new table but not the existing table, wherein the query references the logical model and is resolved by the query layer to access the new table; and synchronizing the at least one field in the existing table by updating the at least one field in the existing table to match the at least one field in the new table.

2. The system of claim 1, wherein accessing the new table comprises:

resolving client code referencing the logical model to run the query, wherein the client code corresponds to query language corresponding to the query; and executing the resolved client code using the query language to access the new table, the existing table, or both.

3. The system of claim 2, wherein resolving the client code comprises resolving the client code to a structured query language (SQL) script referencing two or more fields of the new table, wherein resolving the client code is hidden from the user.

4. The system of claim 1, wherein the query comprises client code referencing the CMDB.

5. The system of claim 4, wherein the client code does not reference the plurality of non-identical tables or the new table.

6. The system of claim 1, wherein generating the new table comprises storing the new table for future use in lieu of running the query against the plurality of non-identical tables.

7. The system of claim 1, wherein the plurality of non-identical tables does not correspond to logical classes of assets stored in the CMDB.

8. The system of claim 1, wherein determining that the first set of fields is commonly accessed at the higher frequency than the second set of fields comprises determining that one or more commonly accessed records of the CMDB correspond to the first set of fields.

9. A computer-implemented method comprising:

identifying a plurality of queries based on usage;

for a plurality of non-identical tables of a configuration management database (CMDB), determining that a first set of fields of a plurality of fields is commonly accessed by the plurality of queries at a higher frequency than a second set of fields of the plurality of fields, wherein the plurality of non-identical tables is referenced by a query layer that is not directly addressable by a user and is addressable via a logical model of the CMDB;

generating a new table accessible via the query layer and comprising the first set of fields, wherein at least one field is duplicated between an existing table and the new table, wherein the new table reduces a number of joins performed when a query is run in comparison to when the query is run against the plurality of non-identical tables;

accessing the new table to run the query, wherein the query is run without joining the existing table such that the at least one field is changed in the new table but not the existing table, wherein the query references the logical model and is resolved by the query layer to access the new table; and synchronizing the at least one field in the existing table by updating the at least one field in the existing table to match the at least one field in the new table.

10. The computer-implemented method of claim 9, wherein accessing the new table comprises:

resolving client code referencing the logical model to run the query, wherein the client code corresponds to query language; and executing the resolved client code using the query language to access the new table.

11. The computer-implemented method of claim 10, wherein the resolving the client code comprises resolving the client code to a structured query language (SQL) script referencing two or more fields of the new table.

12. The computer-implemented method of claim 10, resolving the client code is hidden from the user.

13. The computer-implemented method of claim 9, wherein determining that the first set of fields is commonly accessed at the higher frequency than the second set of fields comprises determining that one or more commonly accessed records of the CMDB correspond to the first set of fields.

14. The computer-implemented method of claim 9, wherein generating the new table comprises storing the new table for future use in lieu of running the query against the plurality of non-identical tables.

15. A non-transitory computer readable medium comprising computer readable code, that when executed by one or more processors, causes the one or more processors to perform operations comprising:

identifying a plurality of queries based on usage;

for a plurality of non-identical tables of a configuration management database (CMDB), determining that a first set of fields of a plurality of fields is commonly accessed by the plurality of queries at a higher frequency than a second set of fields of the plurality of fields, wherein the plurality of non-identical tables is referenced by a query layer that is not directly addressable by a user and is addressable via a logical model of the CMDB;

generating a table accessible via the query layer and comprising the first set of fields, wherein at least one field is duplicated between an existing table and the table, wherein the table reduces a number of joins performed when a query is run in comparison to when the query is run against the plurality of non-identical tables;

accessing the table to run the query, wherein the query is run without joining the existing table such that the at least one field is changed in the table but not the existing table, wherein the query references the logical model and is resolved by the query layer to access the table; and synchronizing the at least one field in the existing table by updating the at least one field in the existing table to match the at least one field in the table.

16. The non-transitory computer readable medium of claim 15, wherein accessing the table comprises:

resolving client code referencing the logical model to run the query, wherein the client code corresponds to query language; and executing the resolved client code using the query language to access the table.

17. The non-transitory computer readable medium of claim 16, wherein resolving the client code comprises resolving the client code to a structured query language (SQL) script referencing two or more fields included in the table.

18. The non-transitory computer readable medium of claim 16, wherein resolving the client code is hidden from the user.

19. The non-transitory computer readable medium of claim 15, wherein the query comprises client code referencing the CMDB.

20. The non-transitory computer readable medium of claim 19, wherein the client code does not reference the table.

* * * * *